United States Patent Office 3,221,068
Patented Nov. 30, 1965

3,221,068
HALOGENATED DI-p-XYLYLENES
William F. Gorham, Berkeley Heights, N.J., assignor to Union Carbide Corporation, a corporation of New York
No Drawing. Filed Mar. 1, 1962, Ser. No. 176,804
9 Claims. (Cl. 260—649)

This invention relates to substituted cyclic di-p-xylylenes, and more particularly to halogenated cyclic di-p-xylylenes having from 1 to 6, inclusive, halogen groups substituted on the aromatic nuclei.

This application is a continuation-in-part of my application Serial No. 50,603, filed August 19, 1960, now abandoned, which in turn is a continuation-in-part of my application Serial No. 622,249, filed November 15, 1956, and now abandoned. In that application, there is disclosed a method of preparation of various substituted p-xylylene polymers by the pyrolysis of a cyclic dimer of the structure

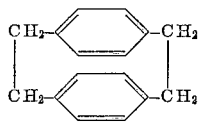

which can also be shown as

for sake of simplicity, and which can have as many as six aromatic nuclear substituent groups, among which can be halogen groups such as chlorine and bromine.

The present invention concerns these halogenated cyclic di-p-xylylenes containing from 1 to 6 inclusive halogen groups substituted on the aromatic nuclei as novel composition of matter, and to the method of their preparation.

According to the present invention, it is possible to prepare these substitued cyclic dimers by halogenating a cyclic di-p-xylylene with free chlorine or bromine to contain as many as six halogen substituents on the aromatic rings by the use of a Friedel-Crafts catalyst according to the following scheme.

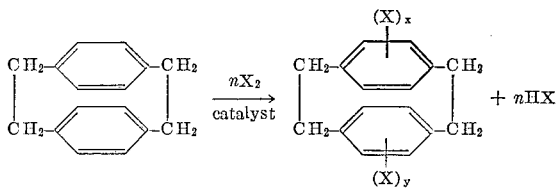

where X represents the halogen and $n$ is the sum of $x+y$, $x$ being a number from 0 to 3, inclusive, and $y$ being a number from 1 to 3 inclusive. Those compounds of the above structure where both $x$ and $y$ are numbers between 1 and 3, inclusive, are new compositions of matter, useful for the preparation of linear halogen-substituted poly-p-xylylenes as illustrated in application Serial No. 622,249, filed November 15, 1956, now abandoned.

Possibly because of steric hindrance or the strained nature of the di-p-xylylene molecule caused by the planar aromatic nuclei, or because of other effects at present unknown, it has not been possible to substitute halogens in all of the eight positions on the aromatic rings. It has also been found in this invention that aliphatic carbon atoms of the di-p-xylylenes do not accept the halogen atoms and that the halogens are substituted only in the aromatic nuclei.

This feature is of considerable value inasmuch as in subsequent pyrolysis and polymerization, there are no sites of aliphatic halogen substitution which could result in dehydro-halogenation and resulting decreased stability of the polymers.

The halogenation reaction is readily conducted in the presence of catalytic quantities of a Friedel-Crafts catalyst. These catalysts, generally considered the halides of such elements as boron, aluminum, zinc, iron, titanium, zirconium, beryllium, tin, hafnium, thallium, niobium, and tantalum, as well as free iodine, are particularly effective in amounts between 0.01 to 1.0% by weight of the di-p-xylylene. It should be understood of course that any quantity of Friedel-Crafts agents that exhibits catalytic activity in effecting the halogenation is covered within this invention. Excess amounts of these Friedel-Crafts agents greater than that providing optimum catalytic activity can of course be used but serve no practical purpose.

While in this invention, the Friedel-Crafts agent actually serves as the catalyst in this halogenation, it is possible to prepare the catalyst in situ by the addition only of the free metal. The free halogen in the reaction serves then to convert a portion of the free metal to the corresponding metal halide and the remainder of the halogen then serves to halogenate the di-p-xylylene. A particularly desirable and inexpensive system is in the use of iron powder in the reaction. A portion of the iron is converted to the iron halide which serves to catalyze the reaction.

I prefer relatively low temperature reactions in this process, i.e. between about 0° C. and 80° C. but as is obvious to those skilled in the art, higher or lower temperatures can be employed and may, in certain adaptations of this invention, be more desirable than the low temperature reactions.

The diverse nature of the halogens, i.e., their reactivity with organic solvents and the reducing nature of the side products formed during the halogenation, has affected the extension of the present process. Halogens having an atomic weight between 35 and 80, i.e. bromine and chlorine, are considered applicable to the present process. The stoichiometry of the system and to some degree the time and severity of the halogenation reaction will affect the degree of halogenation and the yield of the di-p-xylylene. This can readily be determined by those in the art from the following discussion and examples.

The stoichiometry of the system, i.e. the number of moles of elemental halogen employed per mole of di-p-xylylene, basically determines the number of halogen substituents on the di-p-xylylene. By careful control of the reaction conditions, about 80% or more of the products will be the desired substituted material when the stoichiometry is figured at even integers, i.e. 1, 2, 3, 4, 5 or 6, with only small amounts of by-products having a greater or lesser number of substituents being formed. Vacuum distillation readily separates the desired products making possible purities of 95–100% of the desired product.

The reaction is preferably conducted in an inert liquid reaction media and more preferably in an inert halogenated hydrocarbon solvent, such as methylene chloride, carbon tetrachloride, and like materials which are essentially inert to halogenation. However, it is equally possible to conduct the reaction in a liquid which itself may be halogenated during the reaction. In such event, it will be recognized that the stoichiometry of the system would necessarily be adjusted to compensate for the halogenation of the liquid media as well as for the halogenation of the di-p-xylylene.

It has been found that specific combinations of catalyst and solvent can give exceptionally good results and simplify the halogenation process to some extent. For example, iron powder in combination with methylene chloride as the solvent gives an improved product distribution, i.e. a high yield of a desired halogenated product substantially free of other halogenated species is obtained. With this combination, 95% yield and higher of the desired product has been attained. In addition, titanium tetrachloride when used with carbon tetrachloride as the solvent has been found to result in cleaner products which can be used for polymerization without further purification. However, as is apparent to those in the art, other combinations of Friedel-Crafts catalysts and solvents can be used with equal effectiveness in the present process.

As heretofore discussed, these halogenated di-p-xylylenes are useful for the preparation of halogenated poly-p-xylylenes by pyrolysis into high melting crystalline polymers which can be formed into self sustaining films, fibers and molded articles by melt or solution forming techniques. Such polymers are self-extinguishing linear polymers.

The following examples are illustrative of this invention but are not to be considered as any restriction or limitation of the invention.

EXAMPLE I

Dichloro-di-p-xylylene was prepared by mixing 10.4 grams of di-p-xylylene with 500 ml. of carbon tetrachloride, and 0.1 gram of iron powder was placed in a one liter, 3 neck flask equipped with stirrer, drying tube and gas inlet tube. The flask was cooled in a water bath. A total of 7.1 grams of chlorine was bubbled into the stirred suspension through the gas-inlet tube over a 30 minute period. The reaction was completed at the end of one hour, as evidenced by the disappearance of the characteristic chlorine color in the solution. The product was purified by vacuum distillation, and amounted to 14 grams, or 99% yield. The product melted at 160°–170° C. and gave a chlorine analysis of exactly 25.0%, matching the theoretical value of 25.0%. It had the structure

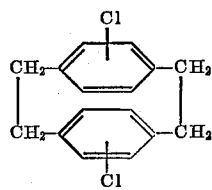

By similar techniques, the bromine substituted di-p-xylylene can be prepared.

EXAMPLE II

A mixture consisting of 5 grams of di-p-xylylene, 0.1 gram of iron powder and 400 ml. of carbon tetrachloride was placed in a 500 ml. 3 neck flask, equipped with a reflux condenser, stirrer and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for twelve hours. The catalyst was filtered off and the solution concentrated to 30 ml. by distillation. Upon cooling, di-bromo-di-p-xylylene crystallized from solution. The material was separated by filtration and purified by sublimation. A total of 3.3 grams equivalent to 37% yield was obtained. The material had a melting point of 240° C.–242° C. The material analyzed for 43.5% bromine, as compared with the theoretical value of 43.7% for di-bromo-di-p-xylylene, having the structure

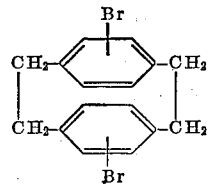

EXAMPLE III

Employing the same technique as in Example I, there was prepared the tetrachloro-di-p-xylylene of the formula

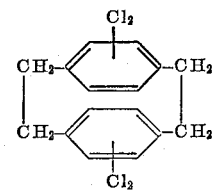

and hexachloro-di-p-xylylene of the formula

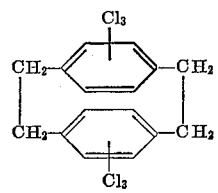

*Preparation of tetrachloro-di-p-xylylene*

In a 500 ml., three-neck flask equipped with stirrer, addition funnel, and reflux condenser was placed 5.0 g. di-p-xylylene, 150 ml. of carbon tetrachloride, and a pinch of iron powder. The flask was immersed in a water bath at 10° C. and a solution of 6.8 g. of chlorine in 150 ml. of carbon tetrachloride added to the stirred mixture over a period of one hour. The solution was stirred for an additional hour, heated to reflux to drive off the by-product hydrogen chloride, and filtered to remove the iron. The solvent was removed by atmospheric distillation and the product purified by vacuum distillation. A total of 7.1 g. of tetrachloro-di-p-xylylene (85% yield), B.P. 180–190° C. at 0.2 mm., M.P. 130–140° C., was obtained. The material contained 40.7% chlorine by elemental analysis compared with the theoretical value of 41% chlorine for tetrachloro-di-p-xylylene.

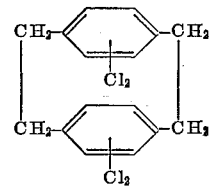

*Preparation of hexachloro-di-p-xylylene*

Employing the same technique as described in Example III, but using 2.08 g. of di-p-xylylene and 4.3 g. of chlorine, a yield of 35% of hexachloro-di-p-xylylene was obtained. The material exhibited B.P. 210–230° C. at 0.2 mm., M.P. 100–110° C. and contained 50.2% chlorine by elemental analysis compared with the theoretical value of 51% chlorine for hexachloro-di-p-xylylene.

EXAMPLE IV

Trichloro-di-p-xylylene having the formula

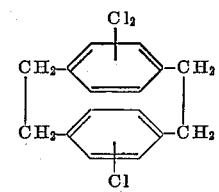

was prepared by mixing four grams of di-p-xylylene, 300 ml. of carbon tetrachloride and 0.1 gram of iron powder in a one liter, 3 neck flask equipped with a stirrer, addition funnel and reflux condenser. A mixture of 4.0 grams of chlorine in 100 ml. carbon tetrachloride was added through the addition funnel to the stirred mixture over a 60 minute period. An immediate reaction occurred, as evidenced by evolution of hydrogen chloride and by the rapid disappearance of the insoluble di-p-xylylene. The reactants were stirred for two hours at room temperature. The solution was filtered to remove the iron powder and the solvent was removed by evaporation at room temperature. The purified product melted at 150°–160° C. and analyzed at 34.0 percent chlorine (theoretical content 34.3 percent). The yield amounted to 77 percent of the trichloro-di-p-xylylene.

EXAMPLE V

*Preparation of pentachloro-di-p-xylylene*

Employing the same technique as described in Example III, but using 4.16 g. of di-p-xylylene and 5.68 g. of chlorine, a yield of 74% of pentachloro-di-p-xylylene was recovered. The material exhibited B.P. 190–195° C. at 0.2 mm., M.P. 100–120° C., and contained 46.2% chlorine by elemental analysis compared with a theoretical value of 46.65% chlorine for pentachloro-di-p-xylylene.

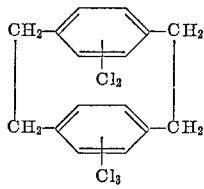

EXAMPLE VI

*Preparation of di-chloro-di-p-xyyene*

Di-chloro-di-p-xylylene was prepared by mixing 200 g. of di-p-xylylene, 4 liters of methylene chloride and 0.1 g. of iron powder in a five liter, 3-necked flask equipped with a gas-inlet tube, a stirrer and a reflux condenser. The mixture was heated to a reaction temperature of about 38°–40° C., that being the slow reflux temperature of the solvent. 140 g. of chlorine was added within three hours. The mixture was stirred for an additional 15 minutes after the completion of the chlorine addition. The catalyst was destroyed by the addition of activated charcoal. The organic solution was removed from the flask and simultaneously filtered. The resulting organic solution was concentrated to dryness and the crude product distilled in vacuo, resulting in 245–260 g. of product (92–98% of theory) containing 95% or more dichloro-di-p-xylylene. The melting point, depending on products distribution, was 170–270° C.

EXAMPLE VII

Employing the same technique as described in Example VI, but using 166.4 g. of di-p-xylylene, 4 liters of carbon tetrachloride, 2 ml. of titanium tetrachloride as catalyst, and adding 115 g. of chlorine to the reaction mixture, maintained at temperatures between 25°–50° C., within 3 hours, and thereafter adding a 5% HCl solution to destroy the catalyst, a yield of 210 g. (95% of theory) of product was recovered containing 89% di-chloro-di-p-xylylene.

EXAMPLE VIII

Employing the same technique as described in Example VI, but using 20.8 g. of di-p-xylylene, 500 ml. of methylene chloride, 0.5 ml. of titanium tetrachloride as catalyst, and adding 14.8 g. of chlorine to the reaction mixture, maintained at temperatures between 38°–40° C., within 50 minutes, and thereafter adding a 5% HCl solution to destroy the catalyst, a yield of 26.3 g. (95% of theory) of product was recovered containing 90–95% di-chloro-di-p-xylylene.

EXAMPLE IX

Employing the same technique as described in Example VI, but using 20.8 g. of di-p-xylylene, 500 ml. of carbon tetrachloride, 0.5–1.0 ml. stannic chloride as catalyst, and adding 14.8 g. chlorine to the reaction mixture, maintained at temperatures between 35°–50° C., within 50 minutes, and thereafter adding a 5% HCl solution to destroy the catalyst, a yield of 26 g. (94% of theory) of product was recovered containing 85–87% di-chloro-di-p-xylylene.

EXAMPLE X

Employing the same technique as described in Example VI, but using 20.8 g. of di-p-xylylene, 500 ml. of carbon tetrachloride, 0.2 g. iodine as catalyst, and adding 15.0 g. of chlorine to the reaction mixture, maintained at temperatures between 35°–50° C., within 50 minutes, and thereafter adding a small amount of aqueous sodium thio-sulfate to destroy the catalyst, a yield of 25 g. (90% of theory) of product was recovered containing about 60% di-chloro-di-p-xylylene.

EXAMPLE XI

*Preparation of trichloro-di-p-xylylene*

Trichloro-di-p-xylylene was prepared employing substantially the same technique as described in Example VI but using 20.8 g. di-p-xylylene, 500 ml. of methylene chloride, 0.5 g. iron powder as catalyst, and adding 22 g. chlorine to the reaction mixture, maintained at temperatures between 38° C.–40° C., within one hour, and thereafter adding charcoal to destroy the catalyst, a yield of 30 g. (96% of theory) of product was recovered containing 95% trichloro-di-p-xylylene.

EXAMPLE XII

Employing the same technique as described in Example XI, but using 20.8 g. of di-p-xylylene, 500 ml. of carbon tetrachloride, 1 ml. titanium tetrachloride as catalyst, and adding 22 g. of chlorine to the reaction mixture, maintained at temperatures between 25°–45° C., within 3 hours, and thereafter adding a 5% HCl solution to destroy the catalyst, a yield of 29 g. (93% of theory) of product was recovered containing 80% trichloro-di-p-xylylene.

EXAMPLE XIII

*Preparation of tetrachloro-di-p-xylylene*

Tetrachloro-di-p-xylylene was prepared by employing substantially the same technique as described in Example VI, but using 145.6 g. of di-p-xylylene, 4 liters of methylene chloride, 1.5 g. iron powder as catalyst, and adding 202 g. chlorine to the reaction mixture, maintained at temperatures between 38°–40° C., within 4 hours, and thereafter adding charcoal to destroy the catalyst, a yield of 220 g. (91% of theory) of product was recovered containing 95–98% tetrachloro-di-p-xylylene.

EXAMPLE XIV

Employing the same technique as described in Example XIII, but using 20.8 g. of di-p-xylylene, 500 ml. carbon tetrachloride, 1.5 ml. titanium tetrachloride as catalyst, and adding 28.4 g. of chlorine to the reaction mixture, maintained at temperatures between 25–45° C., within 1 hour and 20 minutes, and thereafter adding a 5% HCl solution to destroy the catalyst, a yield of 21 g. (61% of theory) of product was recovered containing 65% tetrachloro-di-p-xylylene.

EXAMPLE XV

*Preparation of monobromo-di-p-xylylene*

A mixture consisting of 2.8 grams of di-p-xylylene, 0.1 gram of iron powder and 2 liters of methylene chloride was placed in a three neck flask, equipped with a reflux condenser, stirrer, and addition funnel. A solution of 16 grams of bromine in 100 ml. of carbon tetrachloride was added dropwise from this addition funnel to the stirred suspension over a 3 minute period. The reaction mixture was stirred an additional 15 minutes. 500 cc. of water was added to the reaction mixture and stirring was continued for an additional 15 minutes. The organic layer was separated and filtered and thereafter concentrated to dryness. The material was purified by sublimation. A total of 25 grams equivalent to 87.2% yield was obtained. The material had a melting point of 132°–134° C. Vapor phase chromatographic analysis showed the product to contain 93.6% monobromo-di-p-xylylene.

I claim:
1. A halogenated cyclic di-p-xylylene having the structure

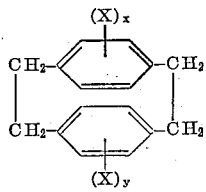

wherein X is a halogen having an atomic weight between 35 and 80, $x$ is a number from 1 to 3, inclusive, and $y$ is a number from 1 to 3, inclusive.

2. The halogenated cyclic di-p-xylylene of claim 1 wherein the halogen is chlorine.

3. The halogenated cyclic di-p-xylylene of claim 1 wherein the halogen is bromine.

4. Dichloro-di-p-xylylene having the structural formula

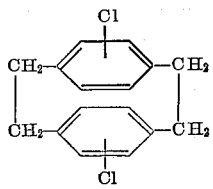

5. Trichloro-di-p-xylylene having the structural formula

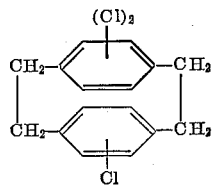

6. Tetrachloro-di-p-xylylene having the structural formula

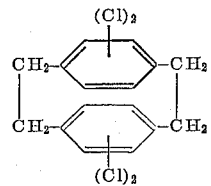

7. Pentachloro-di-p-xylylene having the structural formula

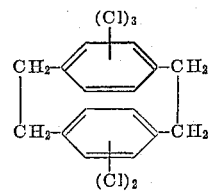

8. Hexachloro-di-p-xylylene having the structural formula

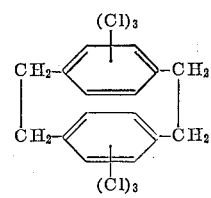

9. Dibromo-di-p-xylylene having the structural formula

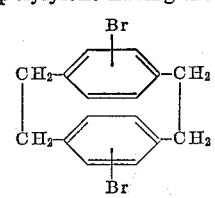

References Cited by the Examiner
UNITED STATES PATENTS

| | | | |
|---|---|---|---|
| 2,452,154 | 10/1948 | Ross | 260—650 |
| 2,849,501 | 8/1958 | Bolton | 260—650 |

FOREIGN PATENTS

| | | |
|---|---|---|
| 275,428 | 9/1951 | Switzerland. |

LEON ZITVER, *Primary Examiner.*